(12) United States Patent
Narusawa

(10) Patent No.: US 11,563,869 B1
(45) Date of Patent: Jan. 24, 2023

(54) COMMUNICATION DEVICE, IMAGE EXPOSURE DEVICE, IMAGE READING DEVICE, AND IMAGE FORMING APPARATUS

(71) Applicant: FUJIFILM Business Innovation Corp., Tokyo (JP)

(72) Inventor: Akihiro Narusawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/577,381

(22) Filed: Jan. 18, 2022

(30) Foreign Application Priority Data

Sep. 3, 2021 (JP) .............................. JP2021-143704

(51) Int. Cl.
*H04N 1/00* (2006.01)

(52) U.S. Cl.
CPC ....... *H04N 1/00994* (2013.01); *H04N 1/0083* (2013.01)

(58) Field of Classification Search
None
See application file for complete search history.

(56) References Cited

U.S. PATENT DOCUMENTS

| 8,279,249 | B2 | 10/2012 | Inoue | |
|---|---|---|---|---|
| 2011/0205327 | A1* | 8/2011 | Inoue | B41J 2/451 347/247 |
| 2021/0195323 | A1* | 6/2021 | Oshikata | H04B 3/26 |

FOREIGN PATENT DOCUMENTS

| CA | 2809345 | A1 * | 3/2012 | ........... H01B 11/002 |
|---|---|---|---|---|
| JP | 2001111287 | | 4/2001 | |
| JP | 5230369 | | 7/2013 | |
| JP | 5428936 | | 2/2014 | |

* cited by examiner

*Primary Examiner* — Lennin R Rodriguezgonzalez
(74) *Attorney, Agent, or Firm* — JCIPRNET

(57) ABSTRACT

A communication device includes a transmission-side board that transmits a signal, a reception-side board that receives the signal transmitted from the transmission-side board, a cable for connecting the transmission-side board and the reception-side board, and plural noise attenuation units that attenuate high frequency noise and are disposed at plural positions in a maximization region of a high frequency current corresponding to plural n-th order resonance frequencies, the plural positions including portions of the cable other than an end portion of the cable, the plural n-th order resonance frequencies being determined by a length of the cable, and n being an integer of 1 or more.

16 Claims, 13 Drawing Sheets

COMMUNICATION DEVICE, IMAGE EXPOSURE DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2021-143704 filed Sep. 3, 2021.

BACKGROUND

(i) Technical Field

The present invention relates to a communication device, an image exposure device, an image reading device and an image forming apparatus.

(ii) Related Art

In the related art, as techniques for suppressing noise of a communication device, for example, techniques disclosed in JP5230369B, JP5428936B, and JP2001-111287A have already been proposed.

JP5230369B discloses an original document reading device that reads an original document. The original document reading device includes a reading unit, a control unit, a first cable, a second cable, and a relay unit. The reading unit includes an image sensor board on which an image sensor is mounted and is capable of moving the inside of a housing of the original document reading device in a predetermined direction. The control unit processes an image signal of the original document, which is output from the reading unit. The first cable is connected to the image sensor board of the reading unit, and the second cable is connected to the control unit. The relay unit is connected to the first cable and the second cable to be fixed to the housing. The ground of the relay unit is electrically connected to the housing, and a resonance frequency generated in accordance with a combination of the length of the image sensor in a longitudinal direction and the length of the first cable is equal to or higher than 230 MHz.

JP5428936B discloses a configuration of including a non-conductive support member, a board, an electrifying member, a first electrifying unit, and a second electrifying unit. The board is provided on the support member. A plurality of light emitting elements arranged in a predetermined direction in order to form an image on a recording medium, a driving unit that causes the plurality of light emitting elements to emit light, a first grounding unit provided at an end portion of the board on a grounding unit side, the grounding unit being provided in a housing of an image forming apparatus, and a second grounding unit provided at a portion of a connection member on the other end side connected to the driving unit, the connection member having one end connected to a control unit that controls the driving unit and the other end connected to the driving unit are formed on the board. The electrifying member is provided at a predetermined position with respect to the support member and is connected to the grounding unit provided in the housing of the image forming apparatus. The first electrifying unit that electrifies the electrifying member and the first grounding member, and the second electrifying unit that electrifies the electrifying member and the second grounding member.

JP2001-111287A discloses a method of mounting an electromagnetic interference suppressor and is configured to cover at least some of lines magnetically coupled to each other in an electric circuit or wiring in an electronic device with the electromagnetic interference suppressor.

SUMMARY

Aspects of non-limiting embodiments of the present disclosure relate to a communication device, an image exposure device, an image reading device and an image forming apparatus that suppresses resonance noise of a high frequency as compared with a case where a ferrite core is disposed only at both end portions in a longitudinal direction of a cable.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a communication device including a transmission-side board that transmits a signal, a reception-side board that receives the signal transmitted from the transmission-side board, a cable for connecting the transmission-side board and the reception-side board, and a plurality of noise attenuation units that attenuate high frequency noise and are disposed at a plurality of positions in a maximization region of a high frequency current corresponding to a plurality of n-th order resonance frequencies, the plurality of positions including portions of the cable other than an end portion of the cable, the plurality of n-th order resonance frequencies being determined by a length of the cable, and n being an integer of 1 or more.

BRIEF DESCRIPTION OF THE DRAWINGS

Exemplary embodiment(s) of the present invention will be described in detail based on the following figures, wherein.

DETAILED DESCRIPTION

Hereinafter, exemplary embodiments of the present invention will be described with reference to the drawings.

First Exemplary Embodiment

Figure 1:
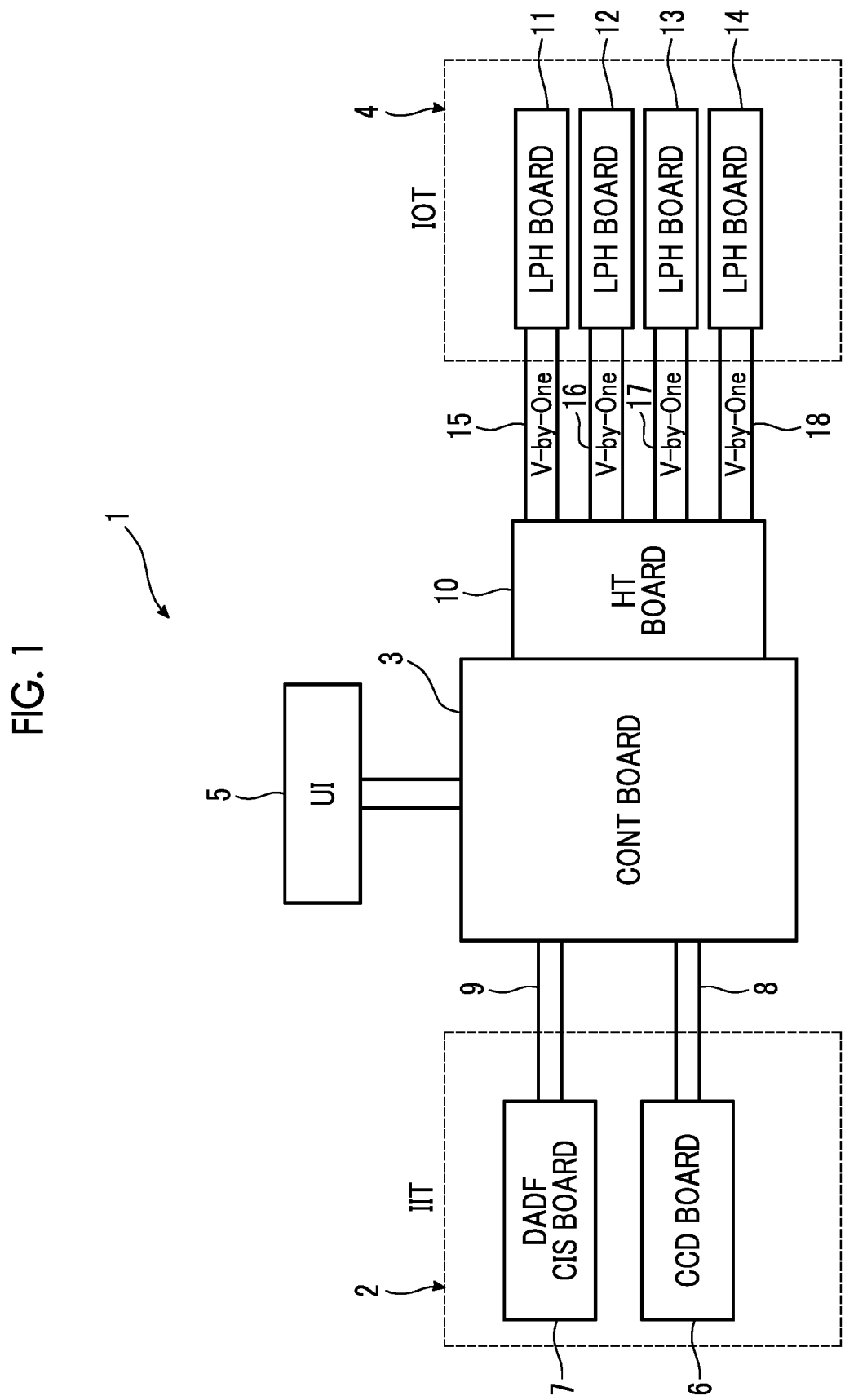
FIG. 1 is a block diagram illustrating a control device in an image forming apparatus to which a communication device according to a first exemplary embodiment of the present invention is applied.

FIG. 1 is a block diagram illustrating a control device in an image forming apparatus to which a communication device according to a first exemplary embodiment of the present invention is applied.

Overall Configuration of Image Forming Apparatus

As illustrated in FIG. 1, roughly, an image forming apparatus 1 includes an image reading device (IIT: image input terminal) 2, a control board 3, and an image output device (IOT: image output terminal) 4. The image reading device 2 reads an image of an original document. The control board 3 is provided as an example of a control device that performs intended image processing on image information of the original document, which is obtained by reading of the image reading device 2, and collectively controls the entirety of the image forming apparatus 1. The image output device 4 is controlled by the control board 3 and outputs an image based on the image information and the like of the original document, which is obtained by reading of the image reading device 2. A user interface (UI: user interface) 5 for the user to operate the image forming apparatus 1 is connected to the control board 3.

The image reading device 2 includes a CCD board 6 and a CIS board 7. The CCD board 6 has a CCD as a reading element that reads an image of an original document placed on a platen glass (not illustrated) or an image of the front surface of an original document automatically transported to a reading position on the platen glass. The CIS board 7 has a contact image sensor (CIS) as a close-contact type reading element that is mounted on a duplex automatic document feeder (DADF) that automatically transports an original document to the reading position on the platen glass and reads an image of the back surface of the original document. In a case where the duplex automatic document feeder includes the CIS board 7, it is possible to read images of both sides of an original document by a so-called one-pass method in which the original document is transported only once, without reversing the front and back surfaces of the original document.

The CCD board 6 and the CIS board 7 in the image reading device 2 are connected to the control board 3 via flexible flat cables (FFC) 8 and 9, respectively. Image signals of RGB or the like, which are transmitted from the CCD board 6 and the CIS board 7 in the image reading device 2 are subjected to intended image processing by the control board 3, and are converted to image information of four colors being yellow (Y), magenta (M), cyan (C), and black (K).

A halftone board 10 is connected to the control board 3. The halftone board 10 performs predetermined halftone image processing such as halftone dot processing based on the respective image signals of yellow (Y), magenta (M), cyan (C), and black (K), which are input from the control board 3. Then, the halftone board 10 outputs image signals having intended gradation as the respective image signals of yellow (Y), magenta (M), cyan (C), and black (K).

In the halftone board 10, as an example of an image exposure device in each of four image creation devices corresponding to the respective colors of yellow (Y), magenta (M), cyan (C), and black (K) in the image output device 4, light emitting diodes (LEDs) as a plurality of light emitting elements are arranged in an axial direction of a photosensitive drum as an example of an image holding unit (not illustrated), and are respectively connected to LPH boards 11 to 14 via flexible flat cables 15 to 18. The LPH boards 11 to 14 are provided as an example of an image exposure board (transmission-side board) including an LED print head (LPH) that irradiates the photosensitive drum with light in accordance with an image signal to form an electrostatic latent image. An insulating layer of the halftone board 10 is grounded, and insulating layers of the LPH boards 11 to 14 are also provided.

In the image forming apparatus 1 according to the first exemplary embodiment, in a case where image signals (image data) are transmitted to the four LPH boards 11 to (as an example of reception-side boards respectively connected via the flexible flat cables 15 to 18) corresponding to the respective colors of yellow (Y), magenta (M), cyan (C), and black (K), from the halftone board 10 as an example of a transmission-side board, a v-by-one (registered trademark) transmission method as an example of a high-speed serial communication method is adopted.

Figure 2:
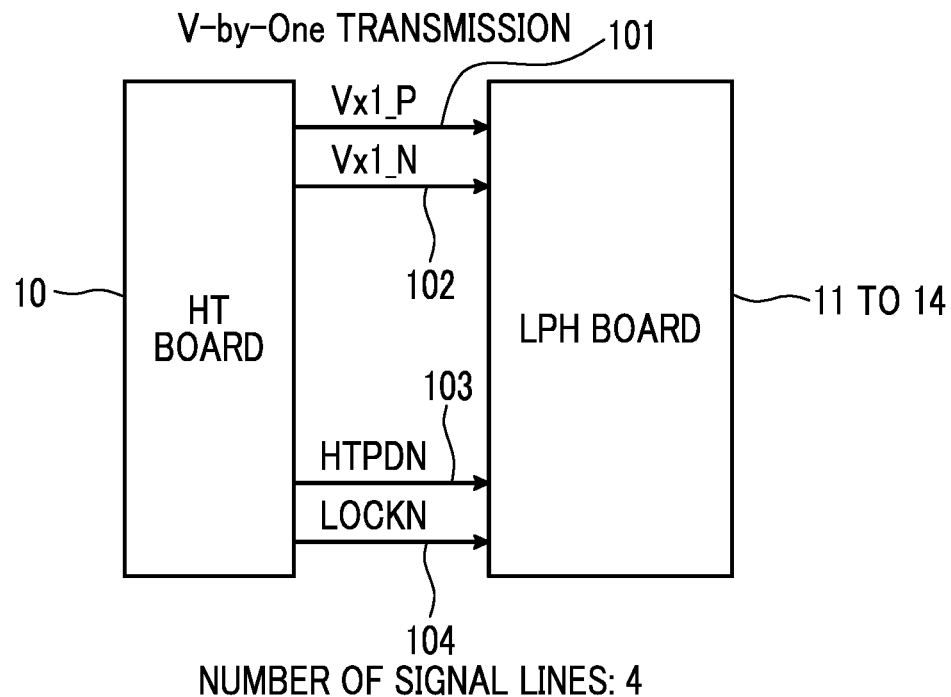
FIG. 2 is a block diagram illustrating a transmission method of an image signal between a halftone board and an LPH board.

As illustrated in FIG. 2, the v-by-one transmission method is a method in which a clock and data are multiplexed (superimposed) and then transmitted. The v-by-one transmission method adopts clock data recovery, which is a function of receiving a signal on a transmission path, in which a clock and data are superimposed, and separating the clock and data from the signal. In the v-by-one transmission method, the transmission quality is improved by introducing an equalizer function, as compared with LVDS in the related art, and further speedup of 3.75 Gbps per pair in the maximum is realized. In addition, in the v-by-one transmission method, the problem of cable skew that has been remarkable in the low voltage differential signaling (LVDS) method in the related art is addressed by adopting the clock data recovery, and electromagnetic interference (EMI) noise is reduced because a clock transmission cable (transmission of a fixed frequency) required in the LVDS method is not required.

In the v-by-one method, basically, image signals are transmitted by using four signal lines including V×1_P 101 and V×1 N 102, a hot plug detection signal (HTPDN) 103, and a CDR lock signal (LOCKN) 104. V×1_P 101 and V×1 N 102 are differential one-pair cables that enable transmission of image signals. The hot plug detection signal 103 indicates the state of a circuit board on a transmission side and the state of a circuit board on a reception side. The CDR lock signal 104 indicates the lock state of a CDRPLL. Therefore, the flexible flat cables 15 to 18 for connecting the halftone board 10 to the LPH boards 11 to 14 may have four wires, and thus it is possible to largely simplify the configuration as compared with the LVDS method. The CDR lock signal (LOCKN) 104 indicates "Low" in a case where serial data is normally received and the CDRPLL is locked, and indicates "High" by external pull-up in a case where CDR training is in progress or reception data has a problem, and thus it is not possible to lock the CDRPLL.

Figure 3:
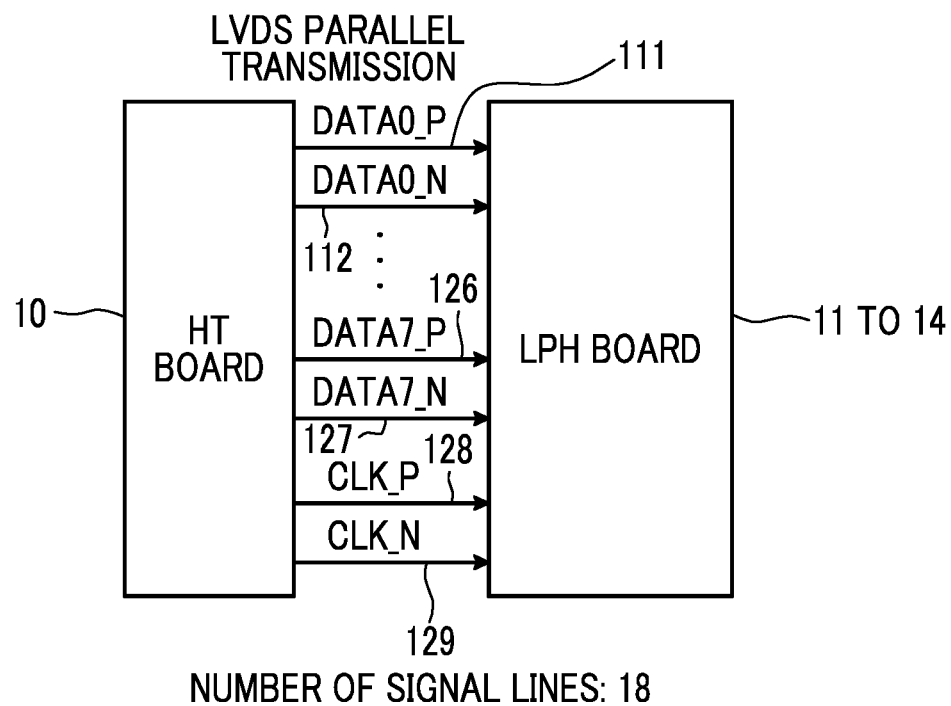
FIG. 3 is a block diagram illustrating a transmission method of an image signal between a halftone board and an LPH board in the related art.

On the other hand, in the case of the LVDS transmission method in the related art, as illustrated in FIG. 3, the total of 18 signal lines of DATA0_P 111, DATA0_N 112, ..., DATA7_P 126, DATA7_N 127, CLK_P 128, and CLK_N 129 are required. Therefore, it is required to use a flexible flat cable having 18 wires as a flexible flat cable for transmitting a signal in the LVDS transmission method, and of a plug for connecting the flexible flat cable to the board also increases in size.

As described above, in the v-by-one method, clock transmission cables (transmission of a fixed frequency) for transmitting CLK_P 128 and CLK_N 129 that have been required in the LVDS method are not required, and thus high frequency noise (EMI) is reduced.

Figure 4:
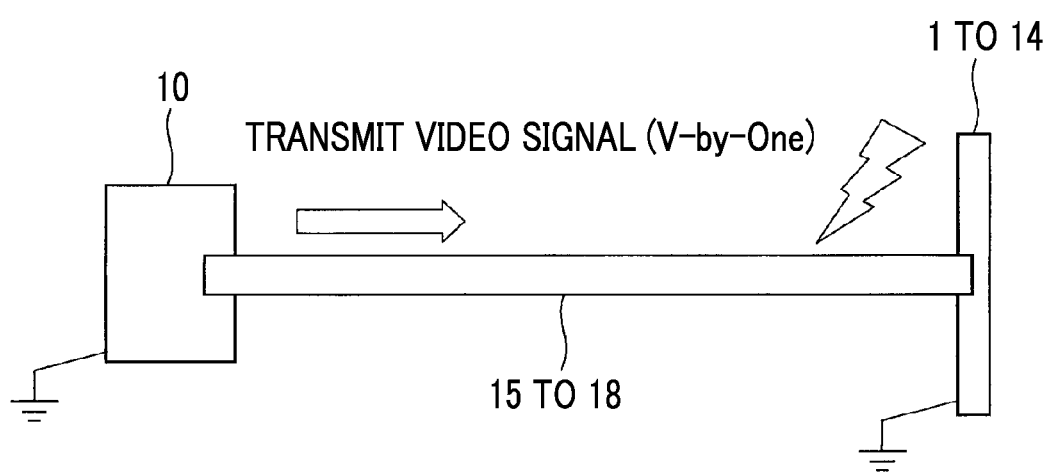
FIG. 4 is a schematic diagram illustrating a noise generation state in transmission of an image signal between the halftone board and the LPH board.

However, as illustrated in FIG. 4, in the v-by-one method, a high-frequency image signal is transmitted by V×1_P and V×1_N, which are differential one-pair cables. Thus, the v-by-one method has a technical problem that high frequency noise (EMI) due to a resonance frequency that resonates with the high-frequency image signal is generated in accordance with the lengths L of the flexible flat cables 15 to 18 for connecting the halftone board 10 on the transmission side and the LPH boards 11 to 14 on the reception side.

Figure 5:
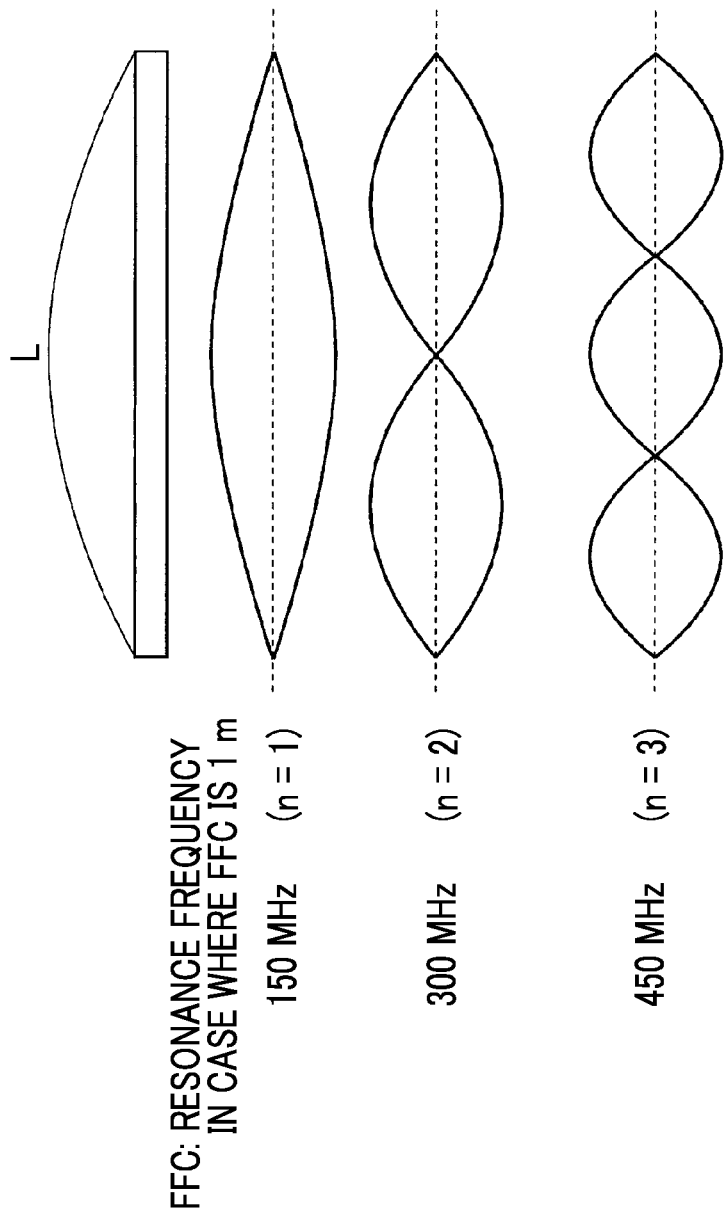
FIG. 5 is a diagram illustrating a resonance frequency generated in a flexible flat cable.

Further describing, as illustrated in FIG. 5, in the case of the v-by-one method, high frequency noise corresponding to a high resonance frequency having both end portions of the flexible flat cable 15 to 18 as nodes or antinodes is generated in accordance with the lengths L of the flexible flat cables 15 to 18 for connecting the halftone board 10 on the transmission side and the LPH boards 11 to 14 on the reception side. As described above, the insulating layers of the halftone board 10 and the LPH boards 11 to 14 are grounded, and thus the potential is zero. An image signal transmitted via the flexible flat cables 15 to 18 by the v-by-one transmission method is capacitive. Regarding a high frequency current excited by the flexible flat cables 15 to 18, the potentials and phases of the insulating layers installed in the halftone board 10 and the LPH boards 11 to 14 are different by 90 degrees.

In a case where a high-frequency image signal flows through the four flexible flat cables 15 to 18, assuming that the lengths L of the flexible flat cables 15 to 18 are equal to each other, for example, 1 m, high frequency noise having 150 MHz being a primary resonance frequency (n=1) for a high-frequency image signal having both end portions of the flexible flat cables 15 to 18 as nodes (half wavelength) is generated.

Similarly, 300 MHz being a secondary resonance frequency (n=2) with both end portions and the center portions of the flexible flat cables 15 to 18, 450 MHz being a tertiary resonance frequency (n=3) with both end portions and positions of ⅓ of the flexible flat cables 15 to 18 as nodes, and the like are generated.

As described above, high frequency noise having n-th order resonance frequencies (n=1, 2, 3, . . . ) generated from the flexible flat cables 15 to 18 may have an influence on peripheral devices and cause malfunctions and poor image quality.

Thus, the image forming apparatus according to the first exemplary embodiment is configured to include a plurality of high-frequency current attenuation units that attenuate high frequency currents and are disposed at positions in a maximization region in which high frequency currents corresponding to a plurality of n-th order resonance frequencies among n-th order resonance frequencies (n=1, 2, 3, . . . ) of a signal, which is determined by the length of the cable, is maximized. The positions are different from each other in the longitudinal direction of the cable.

Here, the maximization region in which the high frequency current is maximized means a region including the position of the "antinode" of the high frequency current. Here, the "antinode" of the high frequency current refers to a point at which the amplitude becomes the maximum in a case where the high frequency current is approximated by a sine wave or the like. The maximization region in which the high frequency current is not limited to the position of the "antinode" of the high frequency current and means a region in which the amplitude of the high frequency current becomes equal to or higher than 95% of the position of the antinode in a case where the high frequency current is approximated by a sine wave or the like. In a case where the high frequency current is approximated by a sine wave, the SIN 70 degrees is about 0.94, and the maximization region in which the high frequency current is maximized can be rephrased as an angle region of ±70 degrees or more.

In the image forming apparatus according to the first exemplary embodiment, the influence of the resonance frequency increases as the value of n becomes smaller among the n-th order resonance frequencies, and thus description will be made to make measures for resonance frequencies, in particular, up to a quaternary resonance frequency, and measures for n-th order resonance frequencies required for quality (secondary in a case where primary and secondary resonance frequencies may be considered, tertiary in a case where primary to tertiary resonance frequencies may be considered, and the like) may be made.

Further, in the image forming apparatus according to the first exemplary embodiment, the plurality of high-frequency current attenuation units are respectively disposed at positions of 4/10±5% of the total length from the end portion of the cable in the longitudinal direction, which correspond to the secondary resonance frequency, the tertiary resonance frequency, and the quaternary resonance frequency, and positions within 1/10 of the total length from the end portion in the longitudinal direction, which correspond to all of the primary resonance frequency to the quaternary resonance frequency. Here, the end portion of the cable in the longitudinal direction of the cable means the end portion of the cable on the halftone board 10 side. Although it is not excluded that a plurality of high-frequency current attenuation units are disposed on both the LPH board 11 to 14 side or the halftone board 10 side, the amplitude of the high frequency current on the halftone board 10 side is greater than the amplitude of the high frequency current on the LPH boards 11 to 14. Thus, for example, disposing a plurality of high-frequency current attenuation units on the halftone board 10 side is desired.

That is, as illustrated in FIG. 1, in the image forming apparatus according to the first exemplary embodiment, the halftone board 10 is connected to the LPH boards 11 to 14 of yellow (Y), magenta (M), cyan (C), and black (K) in the image output device 4 via the respective flexible flat cables 15 to 18. Here, description will be made on the assumption that the lengths of the flexible flat cables 15 to 18 are equal to each other, but the lengths of the flexible flat cables may be different individually or for each plurality.

Figure 6:
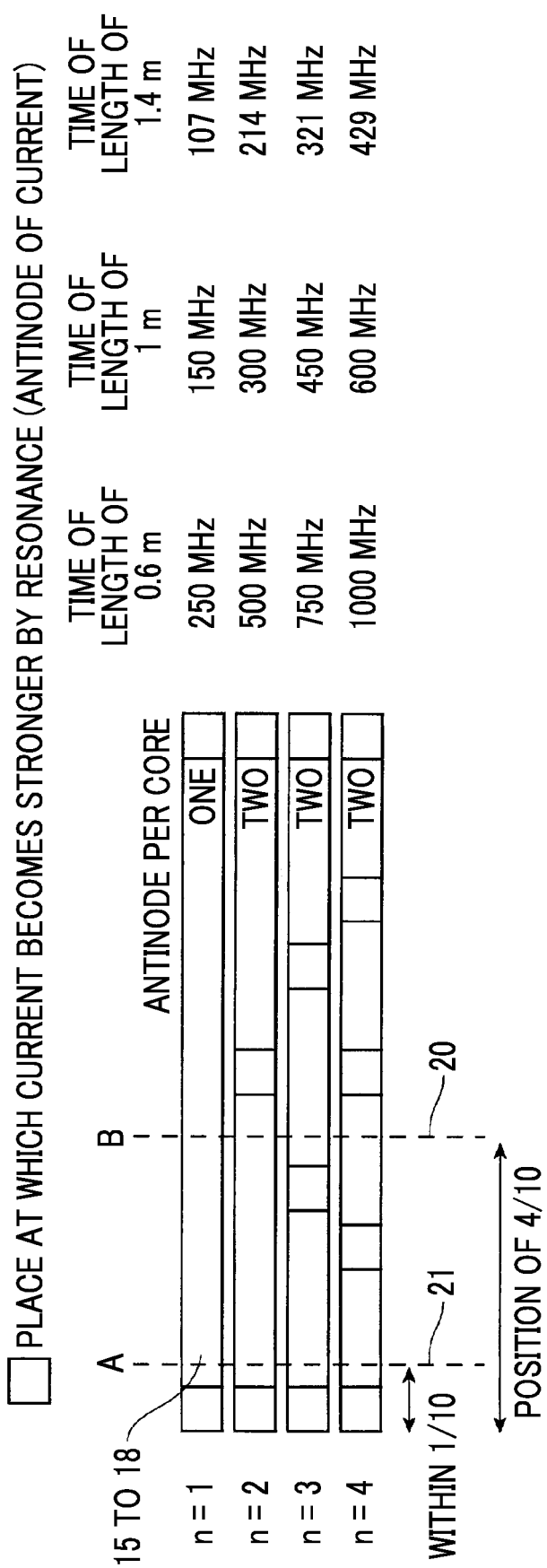
FIG. 6 is a diagram illustrating a principle of the communication device according to the first exemplary embodiment of the present invention.

FIG. 6 is a schematic diagram illustrating the positions of the antinodes of a high frequency current of the n-th order resonance frequency generated in each of the flexible flat cables 15 to 18 in the image forming apparatus according to the first exemplary embodiment.

Assuming that the lengths of the flexible flat cables 15 to 18 are 1 m, as described above, the positions of the antinodes of the high frequency current having the primary resonance frequency of 150 MHz are both end portions of each of the flexible flat cables 15 to 18. Similarly, the positions of the antinodes of a high frequency current having a secondary resonance frequency of 300 MHz are the positions of both end portions and the center portion of each of the flexible flat cables 15 to 18. The positions of the antinodes of a high frequency current having a tertiary resonance frequency of 450 MHz are both end portions of each of the flexible flat cables 15 to 18 and positions of $\frac{1}{3}$ of a distance from the end portion. The positions of the antinodes of a high frequency current having a quaternary resonance frequency of 600 MHz are both end portions of each of the flexible flat cable 15 to 18 and positions at which the distance from the end portions is $\frac{1}{4}$ interval. Further describing, the positions of the antinodes of the high frequency current having the quaternary resonance frequency of 600 MHz are five positions which are both end portions, $\frac{1}{4}$ from the left end, $\frac{1}{4}$ from the right end, and $\frac{1}{2}$ from both end portions.

On the other hand, assuming that the lengths of the flexible flat cables 15 to 18 are 0.6 m, the positions of the antinodes of the high frequency current having the primary resonance frequency of 250 MHz are both end portions of each of the flexible flat cables 15 to 18. Similarly, the positions of the antinodes of a high frequency current having a secondary resonance frequency of 500 MHz are the positions of both end portions and the center portion of each of the flexible flat cables 15 to 18. The positions of the antinodes of a high frequency current having a tertiary resonance frequency of 750 MHz are both end portions of each of the flexible flat cables 15 to 18 and positions of $\frac{1}{3}$ of a distance from the end portion. The positions of the antinodes of a high frequency current having a quaternary resonance frequency of 1000 MHz are both end portions of each of the flexible flat cable 15 to 18 and positions at which the distance from the end portions is $\frac{1}{4}$ interval.

In addition, assuming that the lengths of the flexible flat cables 15 to 18 are 1.4 m, the positions of the antinodes of the high frequency current having the primary resonance frequency of 107 MHz are both end portions of each of the flexible flat cables 15 to 18. Similarly, the positions of the antinodes of a high frequency current having a secondary resonance frequency of 214 MHz are the positions of both end portions and the center portion of each of the flexible flat cables 15 to 18. The positions of the antinodes of a high frequency current having a tertiary resonance frequency of 321 MHz are both end portions of each of the flexible flat cables 15 to 18 and positions of $\frac{1}{3}$ of a distance from the end portion. The positions of the antinodes of a high frequency current having a quaternary resonance frequency of 429 MHz are both end portions of each of the flexible flat cable 15 to 18 and positions at which the distance from the end portions is $\frac{1}{4}$ interval.

Figure 7:
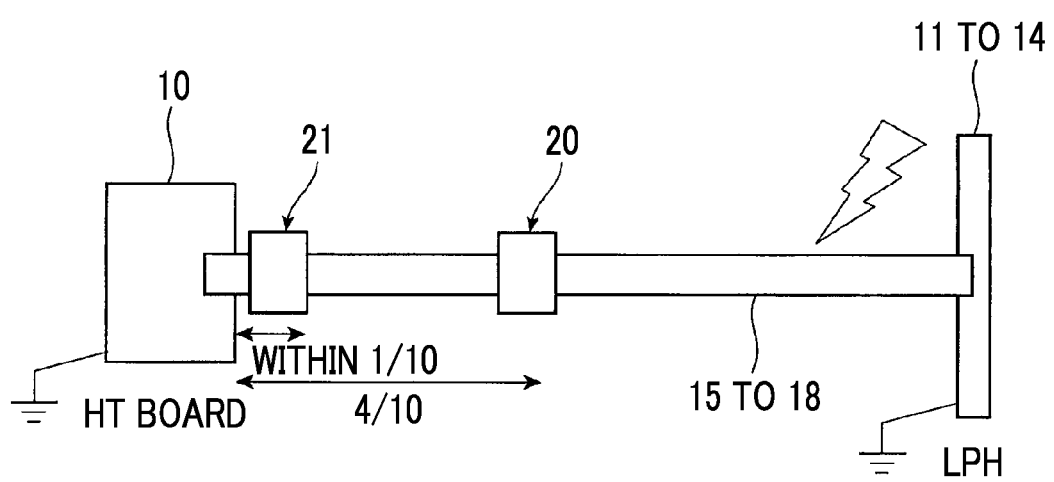
FIG. 7 is a schematic diagram illustrating a configuration of the communication device according to the first exemplary embodiment of the present invention.

As illustrated in FIG. 7, in the first exemplary embodiment, ferrite cores 20 and 21 as an example of the plurality of noise attenuation units are disposed at the position of 0.4 m and the position of 0.1 m, respectively. The position of 0.4 m is the position of $\frac{4}{10}\pm5\%$ of the total length L from the end portion of each of the flexible flat cables 15 to 18 on the halftone board 10 side in the longitudinal direction, which correspond to a secondary resonance frequency, a tertiary resonance frequency, and a quaternary resonance frequency. The position of 0.1 m is the position within $\frac{1}{10}$ of the total length from the end portion on the halftone board 10 side, which corresponds to all of the primary resonance frequency to the quaternary resonance frequency.

As illustrated in FIG. 6, the position of $\frac{4}{10}\pm5\%$ of the total length L from the end portion of each of the flexible flat cables 15 to 18 on the halftone board 10 side in the longitudinal direction is the position corresponding to the vicinity of the position of the antinode in a high frequency current having the secondary resonance frequency, the tertiary resonance frequency, and the quaternary resonance frequency.

Further, the position within $\frac{1}{10}$ of the total length from the end portion of each of the flexible flat cables 15 to 18 on the halftone board 10 side in the longitudinal direction are the position corresponding to the vicinity of the position of the antinode in the high frequency current of the primary resonance frequency to the quaternary resonance frequency.

Each of the insulating layers of the halftone board 10 and the LPH boards 11 to 14 are grounded, and thus the potential is zero (node). Therefore, both end portions on the halftone board 10 side and the LPH boards 11 to 14 side are positions of antinodes in high frequency currents of which the potentials and phases are different by 90 degrees.

In a case where insulating layers of the LPH boards 11 to 14 and the like are not grounded and are open, the phases are different by 90 degrees, and both end portions on the LPH boards 11 to 14 side may be the position of the node in the high frequency current.

Here, the position of $\frac{4}{10}\pm5\%$ of the total length L of the flexible flat cables 15 to 18 from the end portion in the longitudinal direction, and the position within $\frac{1}{10}$ of the total length from the end portion in the longitudinal direction corresponding to all of the primary resonance frequency to the quaternary resonance frequency are not only on the halftone board 10 side being the board on the transmission side, but also on the LPH boards 11 to 14 side being the boards on the reception side. The ferrite cores 20 and 21 are respectively disposed on the halftone board 10 side that is the board on the transmission side, that can expect a more effect of reducing high frequency noise by the ferrite cores 20 and 21.

As described above, the plurality of ferrite cores may be respectively disposed at the position of $\frac{4}{10}\pm5\%$ of the total length L from the end portions of the LPH board 11 to 14 side in the longitudinal direction of the flexible flat cables 15 to 18 on each LPH board side which is the board on the reception side, and the position within $\frac{1}{10}$ of the total length from the end portions on the LPH boards to 14 side, which correspond to all of the primary resonance frequency to the quaternary resonance frequency.

Various ferrite cores can be used as the ferrite cores 20 and 21. In the present exemplary embodiment, as the ferrite cores 20 and 21, an annular or square tubular ferrite core inserted around the outer periphery of the flexible flat cables 15 to 18 is adopted. The ferrite cores 20 and 21 are configured of a magnetic material and some ferrite cores are used for a high frequency, depending on the material of the core. Thus, adopting the ferrite cores 20 and 21 for a high frequency is desired.

As illustrated in FIG. 7, the ferrite cores 20 and 21 attenuates high frequency noise (magnetic noise) by converting the high frequency noise radiated to the outside from the flexible flat cables 15 to 18 into heat by an electromagnetic induction action.

As an example of the plurality of noise attenuation units, the present exemplary embodiment is not limited to the ferrite core. Any unit capable of attenuating high frequency noise radiated to the outside from the flexible flat cables 15 to 18 may be provided, for example, the noise attenuation unit may be configured of a grounded conductor or the like that covers the outer periphery of the flexible flat cables 15 to 18.

As described above, in the image forming apparatus 1 according to the first exemplary embodiment, the ferrite cores 20 and 21 as the example of the plurality of noise attenuation units are disposed at the position of 0.4 m being the position of $4/10\pm5\%$ of the total length L from the end portion of each of the flexible flat cables 15 to on the halftone board 10 side in the longitudinal direction and the position of 0.1 m being the position within $1/10$ of the total length from the end portion on the halftone board 10 side, which corresponds to all of the primary resonance frequency to the quaternary resonance frequency, respectively. Thus, a high-frequency noise current excited by a high-frequency image signal flowing through the flexible flat cables 15 to 18 is attenuated by the ferrite cores 20 and 21 over a plurality of resonance frequencies of, for example, the primary resonance frequency to the quaternary resonance frequency. Therefore, it is possible to suppress an occurrence of malfunction or the like by due to an influence of high frequency noise (EMI) caused by the resonance frequency that resonates with the high-frequency image signal in accordance with the lengths L of the flexible flat cables 15 to 18 on other boards and the like.

Experimental Example 1

In order to confirm the effect of the communication device according to the first exemplary embodiment, the present inventors confirms that high frequency currents corresponding to a primary resonance frequency, a secondary resonance frequency, and a tertiary resonance frequency flow through a flexible flat cable and the intensity of high frequency noise increases at the position corresponding to the antinode of the flexible flat cable.

Then, the present inventors performs an experiment of measuring the intensity of high frequency noise in a case where a ferrite core is disposed at a position of 48 cm from the end portion corresponding to the position of about $1/2$ in the longitudinal direction of the flexible flat cable having a length of 1 m.

Figure 8:
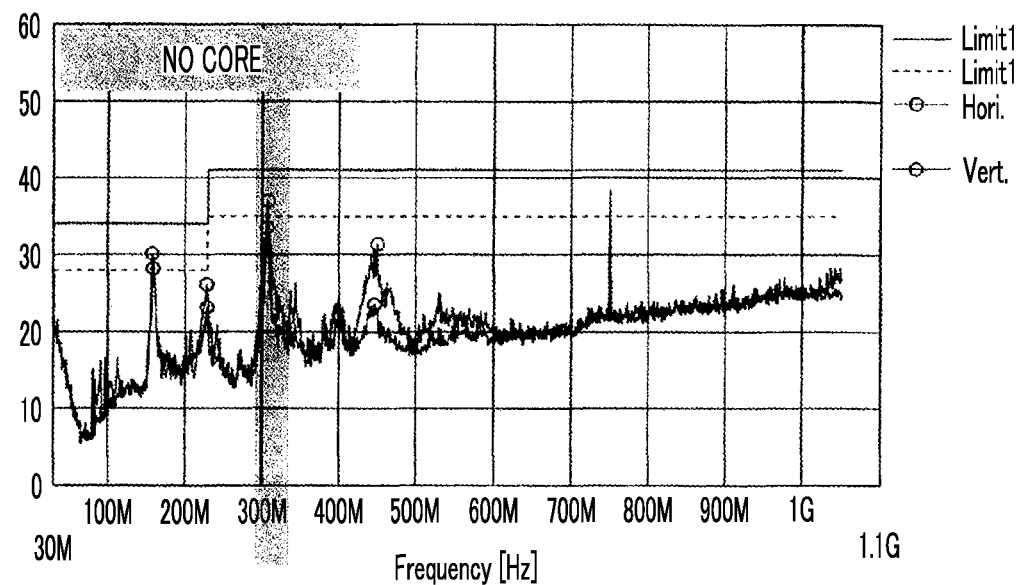
FIG. 8 is a graph showing an experimental example of the communication device according to the first exemplary embodiment of the present invention.
Figure 8:
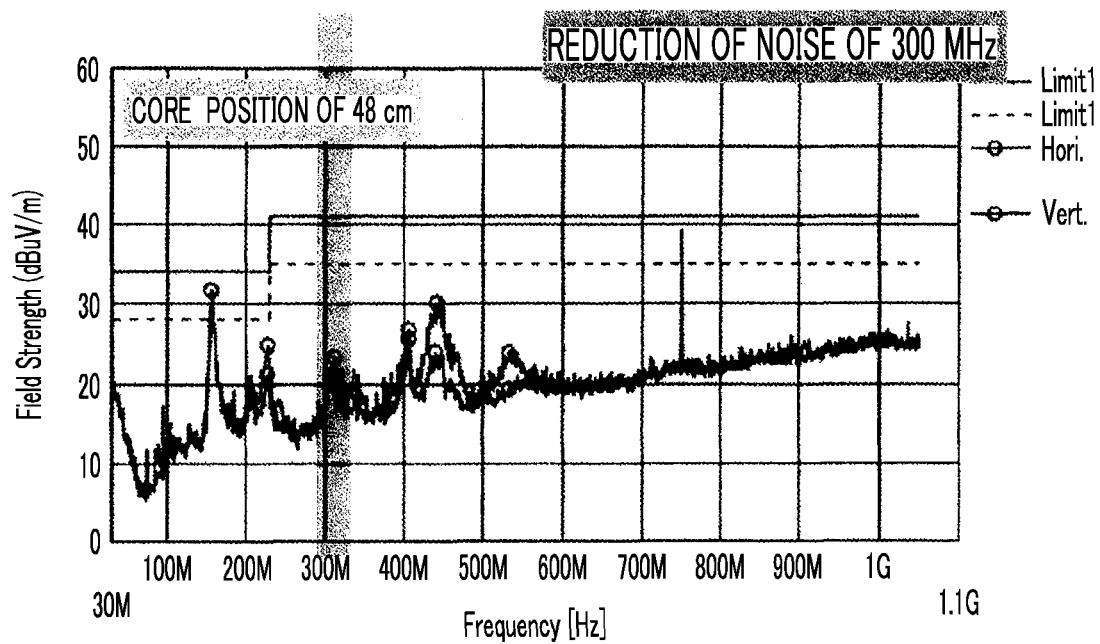

FIG. 8 is a graph showing the results of the above experiment.

As is clear from FIG. 8, it can be seen that the intensity of the high frequency noise corresponding to 300 MHz is largely reduced.

Experimental Example 2

Next, in order to confirm the effect of the communication device according to the first exemplary embodiment, the present inventors disposes a halftone board and an LPH board at positions imitating an actual image forming apparatus as illustrated in FIG. 1, connects the halftone board and the LPH board by the flexible flat cable, and dispose a ferrite core at the position of 7 cm from the end portion as a position less than $1/10$ from the end portion of the flexible flat cable, and the position of 38 cm from the end portion as a position of $4/10\pm5\%$.

Figure 9A:
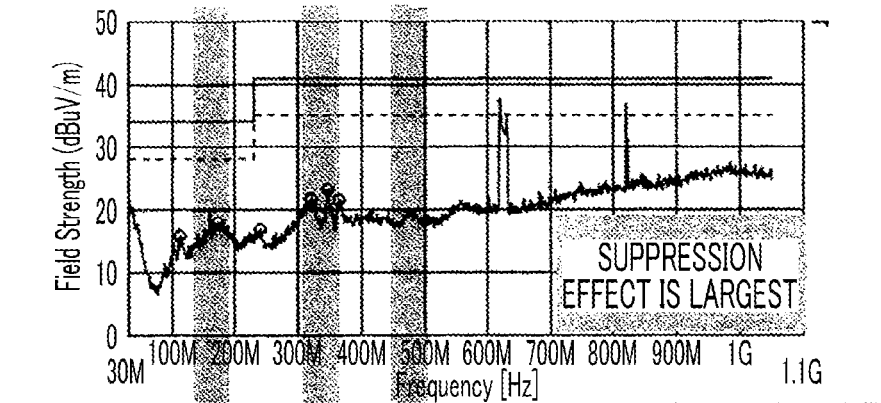
FIGS. 9A to 9D are graphs showing experimental examples of the communication device according to the first exemplary embodiment of the present invention.
Figure 9B:
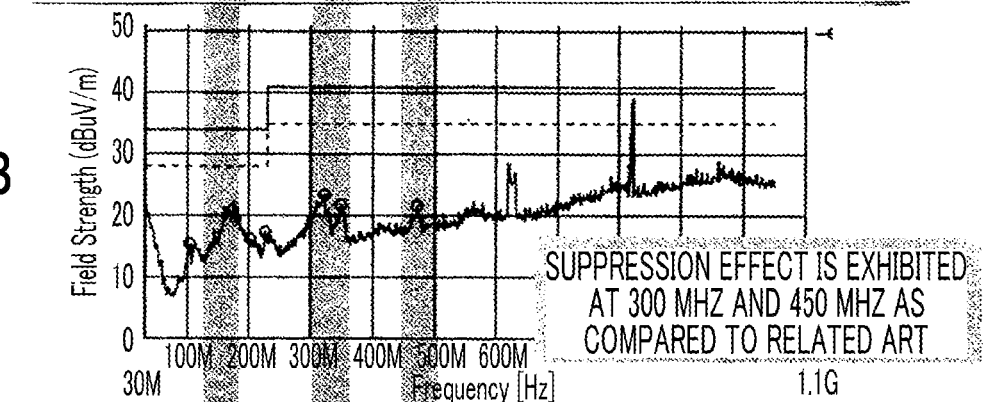

FIG. 9A is a graph showing the results of the above experiment.

As is clear from FIG. 9A, it can be seen that the intensity of the high frequency noise is largely reduced at all of 150 MHz, 300 MHz, and 450 MHz.

Second Exemplary Embodiment

Figure 11:
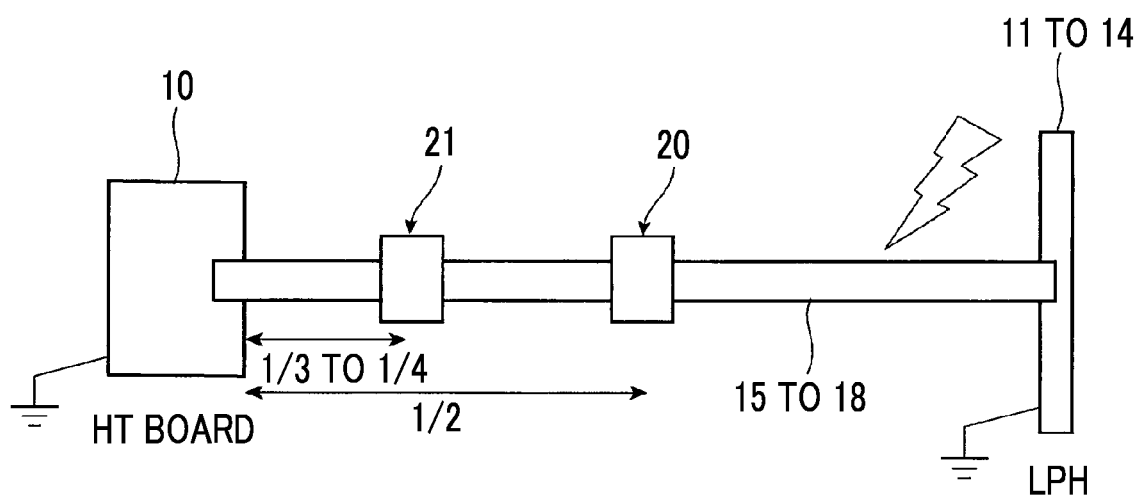
FIG. 11 is a schematic diagram illustrating a configuration of the communication device according to the second exemplary embodiment of the present invention.

FIG. 11 is a diagram illustrating a configuration of the main portion of an image forming apparatus according to a second exemplary embodiment of the present invention.

The second exemplary embodiment is configured so that a plurality of n-th order resonance frequencies are a secondary resonance frequency, a tertiary resonance frequency, and a quaternary resonance frequency.

In the second exemplary embodiment, a plurality of high-frequency current attenuation units are configured to be disposed at positions of $1/2\pm5\%$ of the total length from the end portion in the longitudinal direction of the cable, which correspond to both the secondary resonance frequency and the quaternary resonance frequency and positions of $1/4$ to $1/3$ of the total length from the end portion in the longitudinal direction of the cable, which correspond to both the tertiary resonance frequency and the quaternary resonance frequency.

That is, as illustrated in FIG. 11, in the second exemplary embodiment, ferrite cores 20 and 21 as an example of the plurality of noise attenuation units are disposed at the position of 0.5 m and the position of 0.3 m, respectively. The position of 0.5 m is the position of $1/2\pm5\%$ of the total length L from the end portion of each of the flexible flat cables 15 to 18 on the halftone board 10 side in the longitudinal direction, which correspond to a secondary resonance frequency and a quaternary resonance frequency. The position of 0.3 m is the position of $1/4$ to $1/3$ of the total length from the end portion on the halftone board 10 side, which corresponds to all of the tertiary resonance frequency and the quaternary resonance frequency.

Figure 10:
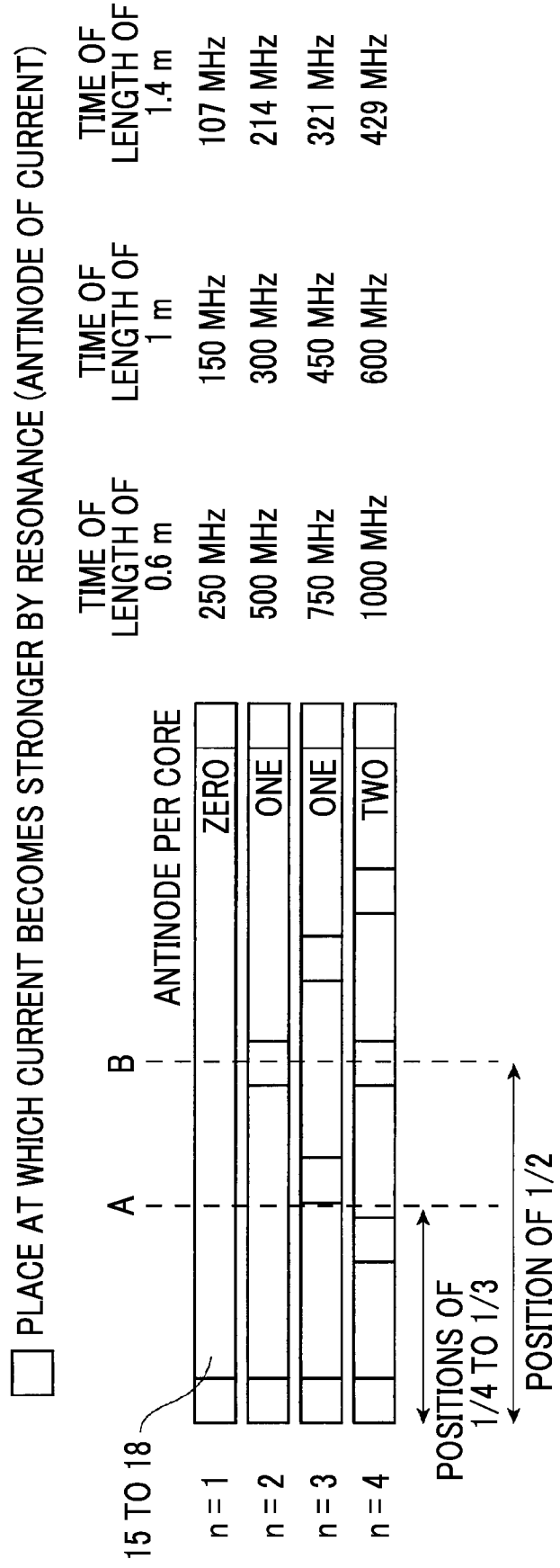
FIG. 10 is a diagram illustrating a principle of a communication device according to a second exemplary embodiment of the present invention.

As illustrated in FIG. 10, the position of $1/2\pm5\%$ of the total length L from the end portion of each of the flexible flat cables 15 to 18 on the halftone board 10 side in the longitudinal direction is the position directly corresponding to the position of the antinode in a high frequency current having the secondary resonance frequency and the quaternary resonance frequency.

Further, the position of $1/4$ to $1/3$ of the total length from the end portion of each of the flexible flat cables 15 to 18 on the halftone board 10 side in the longitudinal direction are the position corresponding to the vicinity of the position of the antinode in the high frequency current of the tertiary resonance frequency and the quaternary resonance frequency.

As described above, as illustrated in FIG. 11, in the image forming apparatus 1 according to the second exemplary embodiment, the ferrite cores 20 and 21 as the example of the plurality of noise attenuation units are disposed at the position of 0.5 m being the position of $1/2\pm5\%$ of the total length L from the end portion of each of the flexible flat cables 15 to 18 on the halftone board 10 side in the longitudinal direction and the position of 0.3 m being the position of $1/4$ to $1/3$ of the total length from the end portion on the halftone board 10 side, which corresponds to all of the primary resonance frequency to the quaternary resonance frequency, respectively. Thus, a high-frequency noise current excited by a high-frequency image signal flowing through the flexible flat cables 15 to 18 is attenuated by the ferrite cores 20 and 21 over a plurality of resonance frequencies of, for example, the primary resonance frequency to the quaternary resonance frequency. Therefore, it is possible to suppress an occurrence of malfunction or the like by due to an influence of high frequency noise (EMI) caused by the resonance frequency that resonates with the high-frequency image signal in accordance with the lengths L of the flexible flat cables 15 to 18 on other boards and the like.

Experimental Example 3

Next, in order to confirm the effect of the communication device according to the second exemplary embodiment, the present inventors dispose a halftone board and an LPH board at a position imitating an actual image forming apparatus as illustrated in FIG. 11, connects the halftone board and the LPH board by the flexible flat cable, and dispose ferrite cores 20 and 21 as an example of a plurality of noise attenuation units, at the position of 0.48 m being the position of ½±5% of the total length L from the end portion of the flexible flat cable and the position of 0.29 m being the position of ¼ to ⅓, respectively.

Figure 12:
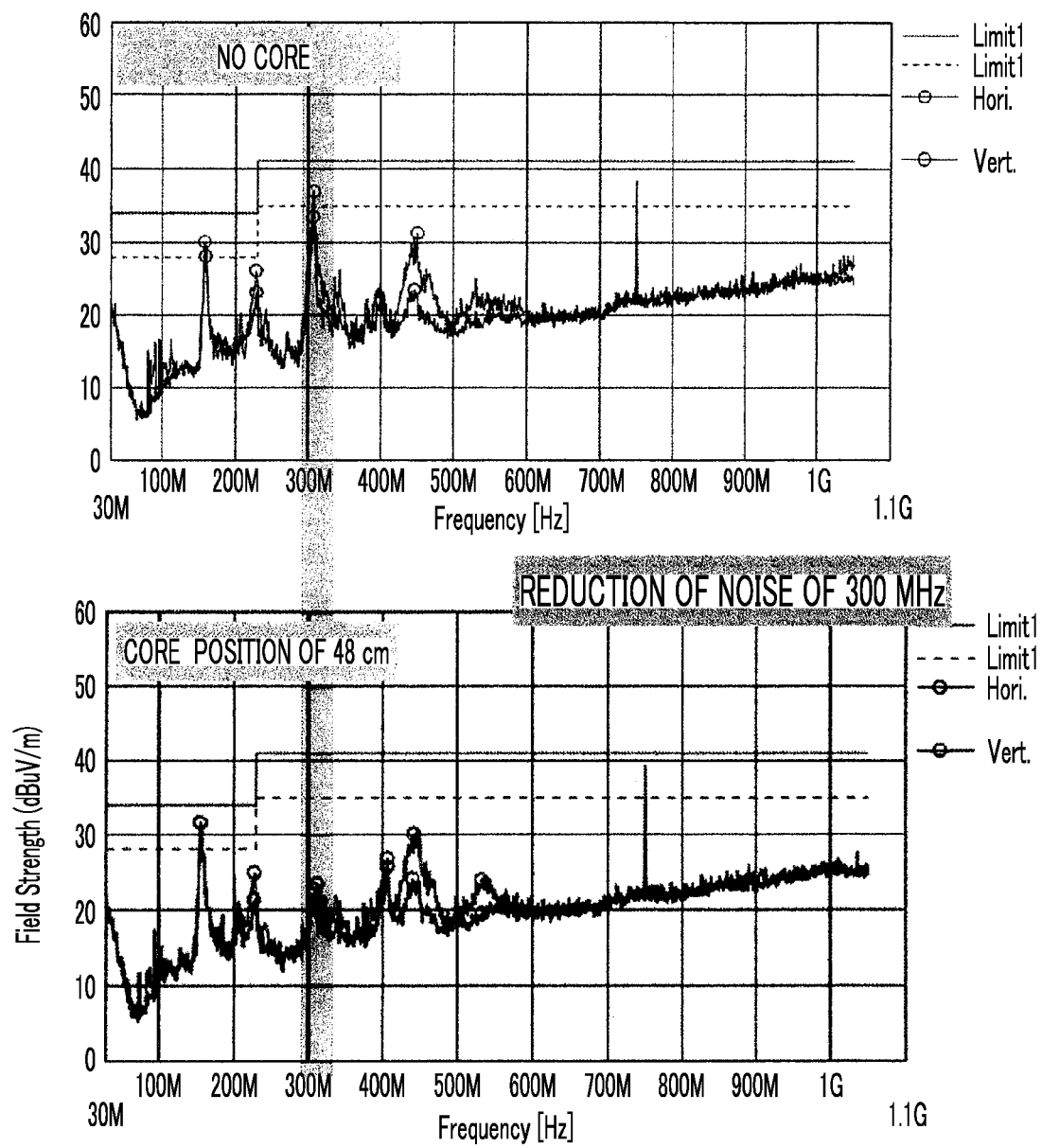
FIG. 12 is a graph showing experimental results of the communication device according to the second exemplary embodiment of the present invention.
Figure 13:
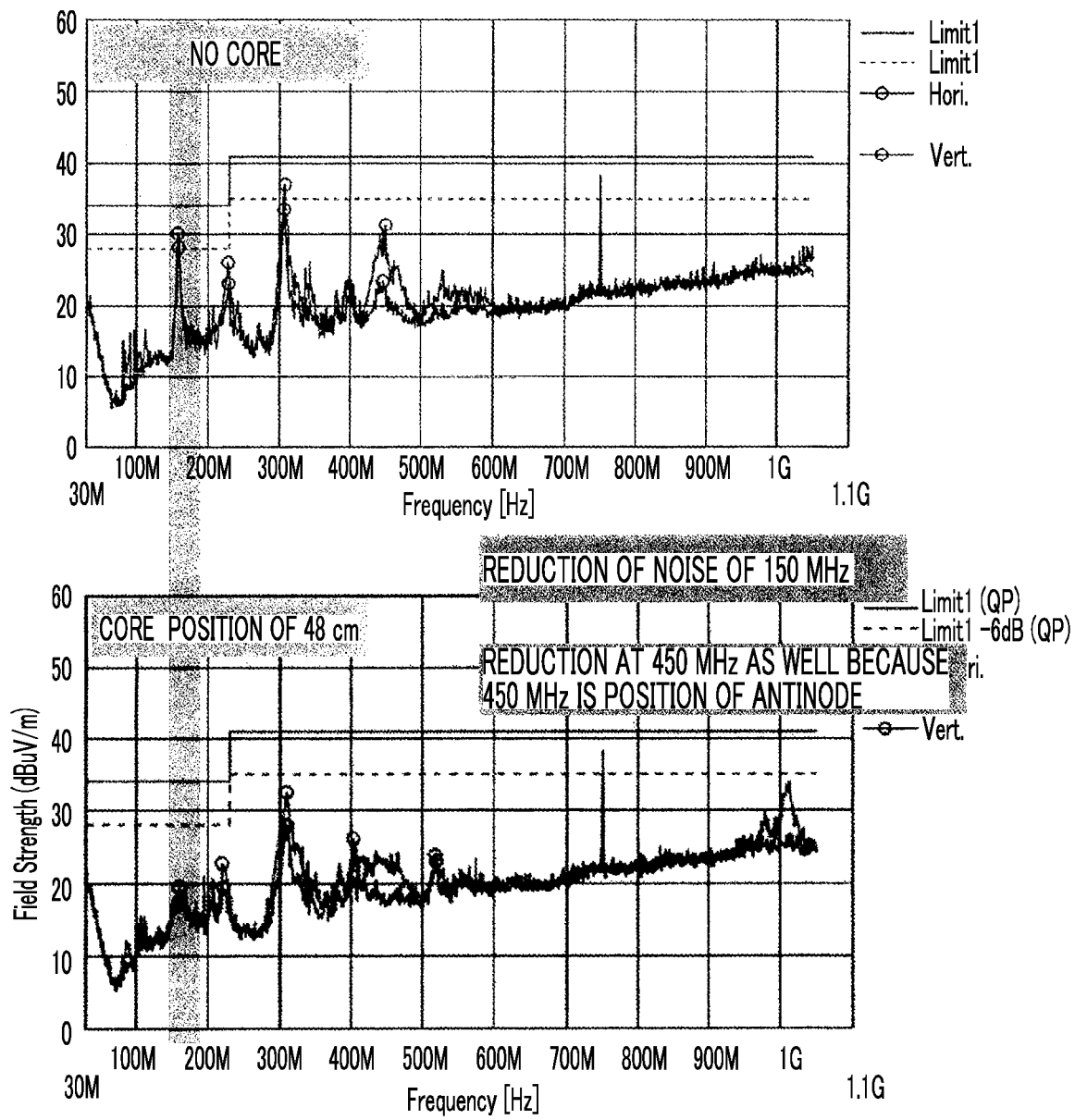
FIG. 13 is a graph showing experimental results of the communication device according to the second exemplary embodiment of the present invention.

FIGS. 12 and 13 are graphs showing the results of the above experiment.

As is clear from FIGS. 12 and 13, it can be seen that the intensity of the high frequency noise is largely reduced at all of 150 MHz, 300 MHz, and 450 MHz.

Comparative Examples 1 and 2

Next, in order to confirm the effect of the communication device according to the above exemplary embodiments, as comparative examples, the present inventors does not provide a ferrite core on a flexible flat cable, or disposes ferrite cores only at both end portions of the flexible flat cable.

Figure 9C:
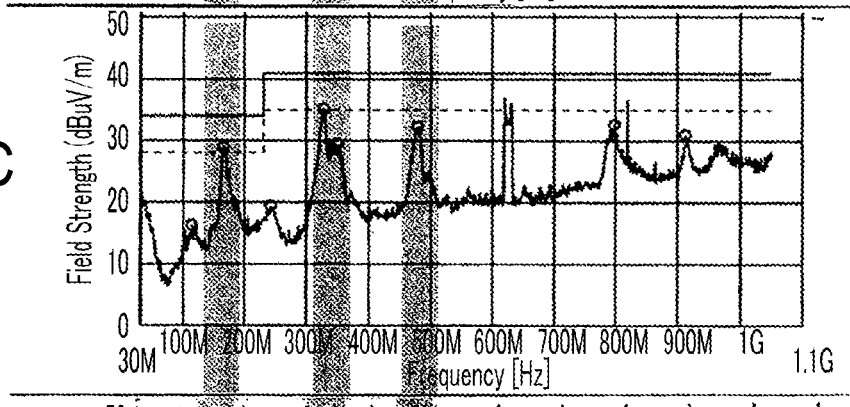
Figure 9D:
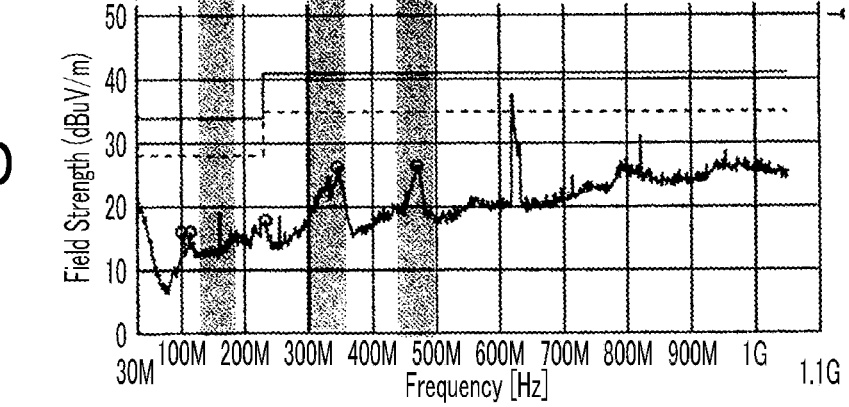

FIG. 9C is a graph showing the result of Comparative Example 1, and FIG. 9D is a graph showing the result of Comparative Example 2.

As is clear from FIGS. 9C and 9D, it can be seen that it is not possible to reduce the intensity of high frequency noise to a satisfactory level.

Third Exemplary Embodiment

Figure 14:
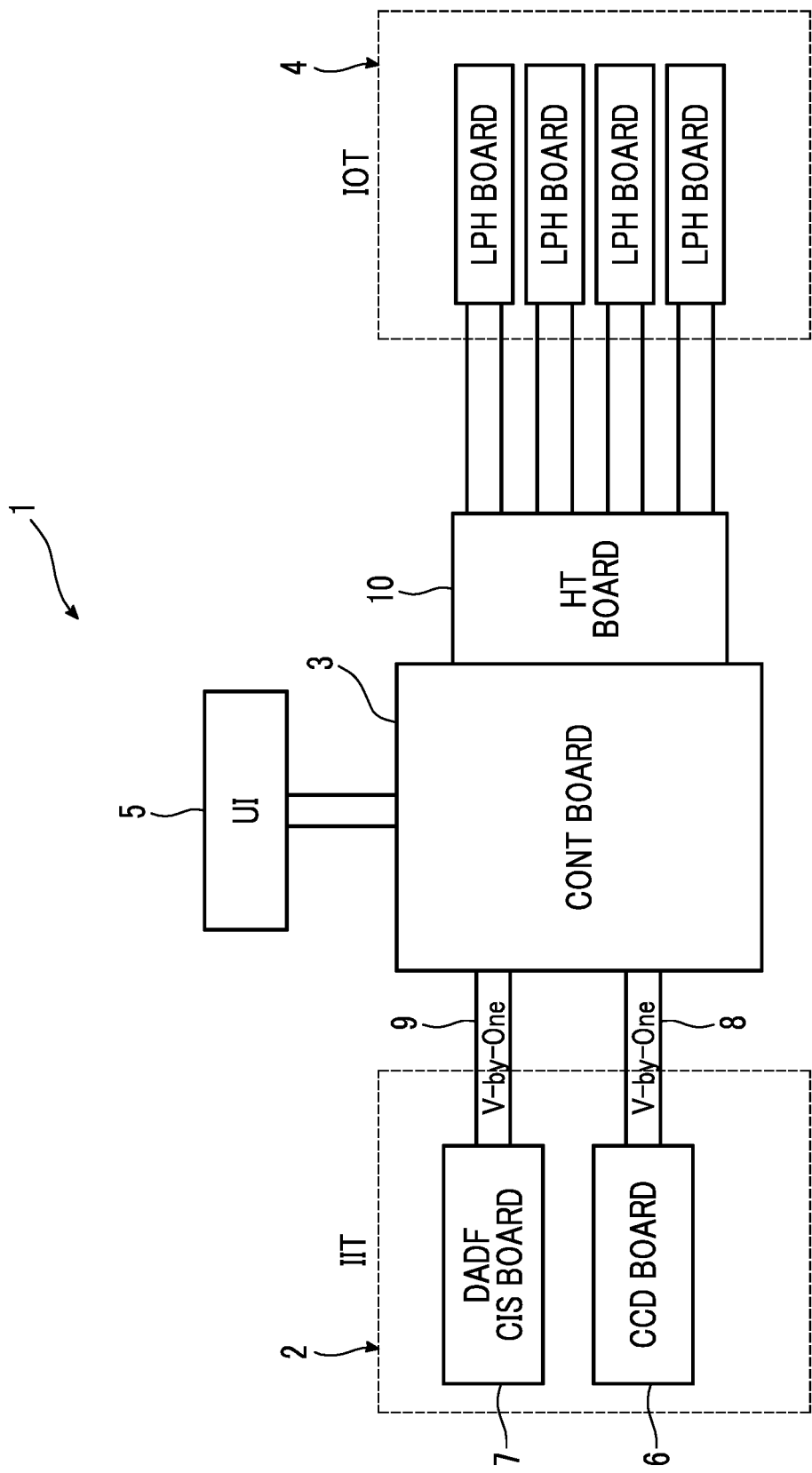
FIG. 14 is a block diagram illustrating a control device in an image forming apparatus to which a communication device according to a third exemplary embodiment of the present invention is applied.

FIG. 14 is a diagram illustrating a configuration of the main portion of an image forming apparatus according to a third exemplary embodiment of the present invention.

The third exemplary embodiment is configured to include an image reception board that receives an image signal from an image reading element that reads an image, a control board that receives an image signal transmitted from the image reception board, and a cable for connecting the image reception board and the control board. The communication device described in any one of claims 1 to 10 is configured as a communication device between the image reception board and the control board.

That is, in the third exemplary embodiment, as illustrated in FIG. 14, the CCD board 6 as an example of the image reception board that receives the image signal from the CCD as the image reading element of the image reading device 2 and the control board 3 as a control board that receives an RGB image signal transmitted from the CCD board 6 of the image reading device 2 by a v-by-one transmission method as an example of a high-speed serial communication method are provided.

Further, in the third exemplary embodiment, as illustrated in FIG. 14, the v-by-one transmission method as an example of the high-speed serial communication method from the CIS board 7 of the image reading device 2 and the CIS board 7 of the image reading device 2, and the control board 3 as a control board that receives an RGB image signal transmitted by a method is provided.

In the illustrated exemplary embodiment, only one flexible flat cable 8 for connecting the CCD board 6 of the image reading device 2 and the control board 3 is shown, but the flexible flat cable is an image signal of three colors of RGB. There are three flexible flat cables provided to transmit.

Similarly, in the illustrated exemplary embodiment, only one flexible flat cable 9 for connecting the CIS board 7 of the image reading device 2 and the control board 3 is shown, but the flexible flat cable is an image signal of three colors of RGB. Three flexible flat cables for transmitting signals are provided.

Further, as the control board, only the entire control board 3 of the image forming apparatus 1 is illustrated, but the image reading device 2 independently may include a control board (not illustrated), and the flexible flat cable may be provided for connecting the CCD board 6 and the CIS board 7 of the image reading device 2, and the control board of the image reading device 2.

Further, in the third exemplary embodiment, a noise reduction device is applied to the image reading device 2, and the lengths of the flexible flat cables 8 and 9 are shorter than the lengths in the first exemplary embodiment and the like. Thus, there is a possibility that the high frequency noise excited by the flexible flat cables 8 and 9 becomes relatively high.

Also in the third exemplary embodiment, the ferrite core or the like are disposed at predetermined positions of the flexible flat cable. Thus, it is possible to reduce high frequency noise.

Since other components and operations are similar to the components and operations in the first exemplary embodiment, the description thereof will be omitted.

In the above-described exemplary embodiments, a case of being applied to a full-color image forming apparatus has been described, but a monochrome image forming apparatus may be used.

Further, in the above-described exemplary embodiments, a case where the noise reduction device according to the present disclosure is applied to the image forming apparatus has been described, but the present disclosure is not limited to the image forming apparatus, and can be applied to other image display devices and the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication device comprising:
a transmission-side board that transmits a signal;
a reception-side board that receives the signal transmitted from the transmission-side board;

a cable for connecting the transmission-side board and the reception-side board; and a plurality of noise attenuation units that attenuate high frequency noise and are disposed at a plurality of positions in a maximization region of a high frequency current corresponding to a plurality of n-th order resonance frequencies, the plurality of positions including portions of the cable other than an end portion of the cable, the plurality of n-th order resonance frequencies being determined by a length of the cable, and n being an integer of 1 or more.

2. The communication device according to claim 1,
wherein the plurality of n-th order resonance frequencies include a primary resonance frequency, a secondary resonance frequency, a tertiary resonance frequency, and a quaternary resonance frequency.

3. The communication device according to claim 2,
wherein at least some of the plurality of noise attenuation units are disposed near the transmission-side board in the cable and are not disposed near the reception-side board.

4. The communication device according to claim 2,
wherein the maximization region is a region in which the high frequency current is equal to or greater than 95% of a maximum value.

5. The communication device according to claim 1,
wherein at least some of the plurality of noise attenuation units are disposed near the transmission-side board in the cable and are not disposed near the reception-side board.

6. The communication device according to claim 1,
wherein the maximization region is a region in which the high frequency current is equal to or greater than 95% of a maximum value.

7. The communication device according to claim 1,
wherein the transmission-side board transmits a signal by a communication method in which a clock is superimposed on data.

8. The communication device according to claim 1,
wherein the transmission-side board transmits a signal by a v-by-one (registered trademark) method being a high-speed serial communication method.

9. The communication device according to claim 1,
wherein the noise attenuation unit includes either a ferrite core that attenuates the high frequency noise by an electromagnetic induction action or a grounded conductor.

10. The communication device according to claim 1,
wherein the cable includes a flexible flat cable.

11. A communication device comprising:
a transmission-side board that transmits a signal by a high-speed serial communication method;
a reception-side board that receives the signal transmitted from the transmission-side board;
a cable for connecting the transmission-side board and the reception-side board; and
a plurality of noise attenuation units that attenuate high frequency noise and are respectively disposed at a position of $4/10 \pm 5\%$ of a total length from an end portion of the cable in a longitudinal direction of the cable and positions within $1/10$ of the total length from the end portion of the cable in the longitudinal direction, the positions corresponding to all of a primary resonance frequency to a quaternary resonance frequency.

12. The communication device according to claim 11,
wherein at least some of the plurality of noise attenuation units are disposed near the transmission-side board in the cable and are not disposed near the reception-side board.

13. The communication device according to claim 11,
wherein a maximization region is a region in which a high frequency current is equal to or greater than 95% of a maximum value.

14. A communication device comprising:
a transmission-side board that transmits a signal by a high-speed serial communication method;
a reception-side board that receives the signal transmitted from the transmission-side board;
a cable for connecting the transmission-side board and the reception-side board; and
a plurality of noise attenuation units that attenuate high frequency noise and are respectively disposed at a position of $1/2 \pm 5\%$ of a total length from an end portion of the cable in a longitudinal direction of the cable and positions of $1/4$ to $1/3$ of the total length from the end portion of the cable in the longitudinal direction, the positions corresponding to both of a tertiary resonance frequency and a quaternary resonance frequency.

15. The communication device according to claim 14,
wherein at least some of the plurality of noise attenuation units are disposed near the transmission-side board in the cable and are not disposed near the reception-side board.

16. The communication device according to claim 14,
wherein a maximization region is a region in which a high frequency current is equal to or greater than 95% of a maximum value.

* * * * *